(12) United States Patent
Osako

(10) Patent No.: US 9,170,347 B2
(45) Date of Patent: Oct. 27, 2015

(54) SAFETY SENSOR AND METHOD FOR DETECTING ABNORMALITY IN SAFETY SENSOR

(75) Inventor: Kazunori Osako, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 721 days.

(21) Appl. No.: 13/254,216

(22) PCT Filed: Jul. 13, 2010

(86) PCT No.: PCT/JP2010/061853
§ 371 (c)(1),
(2), (4) Date: Oct. 13, 2011

(87) PCT Pub. No.: WO2011/013511
PCT Pub. Date: Feb. 3, 2011

(65) Prior Publication Data
US 2012/0278017 A1    Nov. 1, 2012

(30) Foreign Application Priority Data

Jul. 30, 2009 (JP) ................................. 2009-178325

(51) Int. Cl.
| | | |
|---|---|---|
| G01R 13/04 | (2006.01) |
| G01R 13/02 | (2006.01) |
| G06F 3/01 | (2006.01) |
| G06F 3/03 | (2006.01) |
| G01V 8/20 | (2006.01) |

(52) U.S. Cl.
CPC ......................................... *G01V 8/20* (2013.01)

(58) Field of Classification Search
CPC ....................................................... G01V 8/00
USPC ............. 702/64, 72, 127, 150, 152, 166, 179; 250/221; 340/635
See application file for complete search history.

(56) References Cited

U.S. PATENT DOCUMENTS

| | | | | |
|---|---|---|---|---|
| 6,411,856 | B1* | 6/2002 | Takeuchi et al. | ................... 700/3 |
| 6,858,832 | B2* | 2/2005 | Wake et al. | .................... 250/221 |
| 8,395,104 | B2* | 3/2013 | Sato | .............................. 250/221 |
| 2006/0071154 | A1* | 4/2006 | Osako et al. | .................. 250/221 |
| 2012/0032812 | A1* | 2/2012 | Kozawa et al. | ............... 340/635 |

FOREIGN PATENT DOCUMENTS

| | | |
|---|---|---|
| JP | 2000-111655 A | 4/2000 |
| JP | 2005-049172 A | 2/2005 |
| JP | 2008-181798 A | 8/2008 |

OTHER PUBLICATIONS

OMRON Corporation.; "Safety light curtain (Type 4) F3SJ Ver.2"; Catalog; Internet: http://www.fa.omron.co.jp/data_pdf/cat/f3sj_ver2_ds_i_5_1.pdf; 77 pages (Jul. 2009) (English translation of pp. 24-27 are attached).

* cited by examiner

Primary Examiner — Eliseo Ramos Feliciano
Assistant Examiner — Felix Suarez
(74) Attorney, Agent, or Firm — Marvin A. Motsenbocker; MOTS Law, PLLC

(57) ABSTRACT

Disclosed is a safety sensor provided with a plurality of input signal lines for inputting signals for setting. Specifically disclosed is a safety sensor wherein at least one input signal line is provided with a high-level detection circuit and a low-level detection circuit. In an initialization process wherein setting of an operation mode is permitted, a CPU registers in a memory the on-off states of detection signals from the respective detection circuits on condition that the on-off states of detection signals are mutually opposite, and the CPU identifies the connection state of the input signal line on the basis of the on-off states and sets an operation mode corresponding to the connection state. After setting the operation mode is completed, the CPU monitors the detection signals from the respective detection circuits and determines, when at least either of the detection signals comes into a state different from the states registered in the memory, as occurrence of abnormality in the connection state of the input signal line.

3 Claims, 7 Drawing Sheets

| Input from high-level detection circuit | Input from low-level detection circuit | Determination result |
|---|---|---|
| Off | Off | Abnormal (Opened state) |
| On | Off | Normal (Connection to 24 V) |
| Off | On | Normal (Connection to 0 V) |
| On | On | Abnormal (Circuit abnormality) |

(1) Setting of automatic reset (2) Setting of manual reset

SAFETY SENSOR AND METHOD FOR DETECTING ABNORMALITY IN SAFETY SENSOR

TECHNICAL FIELD

The present invention relates to a safety sensor that detects invasion of an object in a dangerous region and, particularly to a safety sensor designed such that an operation mode can be selected according to a wiring pattern.

BACKGROUND ART

A multiple-optical-axis photoelectric sensor used to control supply of power to a machine in a dangerous region is configured to turn off an output in order to ensure safety, when an object is detected, and when occurrence of an abnormality is detected in the sensor (for example, refer to Patent Document 1).

Some of this type of sensors are designed to allow switching of operation mode according to an installation environment, a use application, and the like. For example, in a multiple-optical-axis photoelectric sensor developed by an applicant, the operation mode for an interlock function is set by a combination of connection states of two signal lines (see Non-Patent Document 1)

FIG. 10 illustrates a wiring method disclosed in Non-Patent Document 1 regarding the operation mode of the interlock function. Here, one of an automatic reset mode and a manual reset mode is selected by a function selecting signal line P4 and a reset-signal inputting signal line P2.

The automatic reset mode provides automatic return of the sensor output to, an on-state after an optical axis is blocked to stop the output of the sensor, according to release of the light obstruction state. When the automatic reset mode is set, as illustrated in FIG. 10(1), the reset signal inputting signal line P2 is short-circuited to a 24-V (high-level) power supply line 3H through a normally-closed switch S1 while the function selecting signal line P4 is connected to the 0-V (low-level) power supply line 3L.

The manual reset mode maintains an output off-state after the light obstruction state is released and the output is returned to the on-state from input of the reset signal. When the manual reset mode is set, as illustrated in FIG. 10(2), the reset-signal inputting signal line is connected to the 24-V power supply line 3H through a normally-open switch S2, while the interlock function selecting signal line is connected to the 24-V power supply line 3H.

According to the above configuration, the automatic reset mode is set when the low-level signal is input from the signal line P4 while the high-level signal is input from the signal line P2, and the manual reset mode is set when the high-level signal is input from the signal line P4 while the low-level signal is input from the signal line P2. An error state occurs when a different combination of input signals from the two combinations described above is input.

PRIOR ART DOCUMENT

Patent Document

Patent Document 1: Japanese Unexamined Patent Publication No. 2005-49172

Non-Patent Document

Non-Patent Document 1: "Safety light curtain (Type 4) F3SJ Ver. 2" catalog, Internet http://www.fa.omron.co.jp/data_pdf/cat/f3sj_ver2_ds_j_5_1.pdf, search on Jul. 21, 2009

DISCLOSURE OF THE INVENTION

Problems to be Solved by the Invention

In the multiple-optical-axis photoelectric sensor having the above configuration, although the two output signal lines are provided to ensure safety with respect to the output, only one signal line is set in each signal with respect to the input signal line. In this configuration, even if a breakdown such as disconnection occurs in the input signal line to cause abnormality of the input signal, the abnormality cannot be detected, which risks a false operation mode.

In order to solve the above problem, desirably the two signal lines are provided in each input signal similarly to the output signal line. However, in this case, the number of signal lines is increased. This complicates wiring and incurs a risk of faulty wiring.

In view of the foregoing, an object of an aspect of the present invention is to enhance reliability of the input signal to improve accuracy of setting the operation mode without providing a configuration in which signals including the same contents are input from the plurality of input signal lines.

Means for Solving the Problems

In a safety sensor according to an embodiment, a plurality of input signal lines for inputting signals for setting are provided, an operation mode is set according to a connection state of each input signal line to a high-level power supply line or a low-level power supply line, and an output is stopped according to detection of an object or occurrence of an abnormality. The safety sensor is provided with a first detection circuit that sets at least one input signal line to a monitoring target and outputs an on-state detection signal by detecting that a voltage applied to the monitoring-target signal line is a high level; a second detection circuit that outputs the on-state detection signal by detecting that the voltage applied to the monitoring-target signal line is a low level; and a memory in which on-off states of the detection signals from the first and second detection circuits are registered.

The safety sensor is further provided with a registration setting means for registering the on-off states of each detection signal in the memory on condition that the on-off states of the detection signals from the first and second detection circuits become conflicting in an initialization process in which the setting of the operation mode is permitted, for determining the connection state of the monitoring-target signal line based on the on-off states of the detection signals, and for setting the operation mode according to the connection state of the monitoring-target signal line; and abnormality detection means for monitoring the detection signals from the first and second detection circuits after the registration in the memory is completed, and for determining that the abnormality occurs in the connection state of the monitoring-target signal line when at least either of detection signals comes into a state different from the states registered in the memory.

According to the above configuration, when the sensor is placed and wiring is completed, the signal is input to each detection circuit from the monitoring-target signal line. At this point, in the case that the monitoring-target signal line is connected to the high-level power supply line, the detection signal from the first detection circuit becomes the on-state, and the detection signal from the second detection circuit becomes the off-state. On the other hand, in the case that the monitoring-target signal line is connected to the low-level power supply line, the detection signal from the first detection circuit becomes the off-state, and the detection signal from the second detection circuit becomes the on-state. Thus, the monitoring-target signal line is correctly connected to one of the power supply lines, and the on-off states of the detection signals of the detection circuits conflict. In this case, the states are registered in memory. Therefore, even in the one input signal line for setting the operation mode, the reliability of the input signal from the input signal line is enhanced to ensure setting of the operation mode.

After registration, when the monitoring-target line is disconnected to become an opened state, when the monitoring-target line is connected to a power supply line different from the original power supply line, or when a breakdown occurs in the monitoring-target line or a connection terminal thereof, the detection signals from the first and second detection circuits differ from those registered in the memory. In the above sensor, the case that the detection signals from the first and second detection circuits differ from those registered in the memory is detected as abnormal. Therefore, the output from the sensor can be stopped according to the detection.

In the safety sensor, desirably the "initialization process in which the setting of the operation mode is permitted" is performed from power-on of the sensor. Alternatively, the initialization process may be performed according to the input of the reset signal from the external device connected to the sensor.

In the safety sensor, in the case that the plurality of input signal lines are set to the monitoring target of the present invention, the first and second detection circuits are provided in each input signal line.

In a preferred aspect of the above safety sensor, the registration setting means determines that the abnormality occurs in the monitoring-target signal line or a peripheral circuit thereof when the detection signals in which the on-off states become a consistent relationship are input from the first and second detection circuits in the initialization process. Therefore, the output from the sensor can be stopped to enhance the safety in the case that the abnormality occurs in the connection state of the monitoring-target signal line.

In a method for detecting abnormality according to an embodiment a safety sensor in which a plurality of input signal lines for inputting signals for setting are provided, an operation mode is set according to a connection state of each of the input signal lines to a high-level power supply line or a low-level power supply line, an output is stopped according to detection of an object or occurrence of abnormality, the safety sensor includes: a first detection circuit that outputs an on-state detection signal by detecting that a voltage applied to at least one input signal line is a high level; and a second detection circuit that outputs the on-state detection signal by detecting that the voltage applied to the signal line is a low level. On-off states of each detection signal are registered in a memory on condition that the on-off states of the detection signals from the first and second detection circuits become a conflicting relationship in an initialization process in which the setting of the operation mode is permitted to be set to the safety sensor, the connection state of the input signal line to which the first and second detection circuits are provided is determined based on the on-off states of the detection signals, and the operation mode is set according to the connection state of the input signal line. The detection signals from the first and second detection circuits are monitored after the setting of the operation mode is completed, and a determination that the abnormality occurs in the connection state of the input signal line to which the first and second detection circuits are provided is made when at least either of detection signals comes into a state different from the states registered in the memory.

The detection signal monitoring process can be performed by a control portion in the safety sensor after the initialization process and the setting of the operation mode in the method. Alternatively, the detection signal monitoring process may be performed by a computer outside of the sensor. The registration destination of the on-off states of each detection signal is not limited to the memory provided in the sensor, but the on-off states of each detection signal may be registered in a memory outside of the sensor.

Effects of the Invention

According to the safety sensor of an embodiment, the reliability of the input signal can be enhanced even if the method for inputting the signals including the same contents from the plurality of input signal lines is not adopted. Therefore, the operation modes relating to various functions can stably be set without complicating the wiring.

BEST MODE FOR CARRYING OUT THE INVENTION

Figure 1:
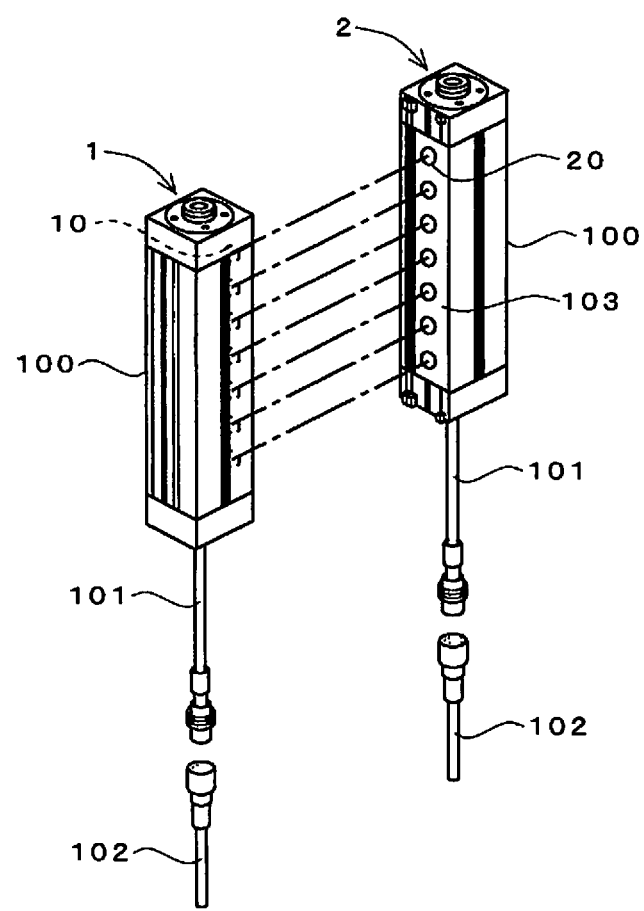
FIG. 1 is a perspective view illustrating an appearance of a multiple optical axis photoelectric sensor.

FIG. 1 illustrates an appearance of a multiple optical axis photoelectric sensor to which the present invention is applied.

Each of a projector 1 and an optical receiver 2 of the multiple optical axis photoelectric sensor is configured such that a plurality of optical elements (a light emitting element 10 in the projector 1 and a light receiving element 20 in the optical receiver 2) and a control board (not illustrated) are accommodated in a rectangular-solid casing 100. A cord 101 in which various signal lines are collected is drawn from a lower end of each casing 100. An extension second cord 102 is connected to the cord 101.

Window portions 103 are formed in a front surface of each casing 100 in order to transmit light. The light emitting elements 10 and the light receiving elements 20 are arrayed along a longitudinal direction of the casing 100. Light transmission surfaces of the light emitting elements 10 and light receiving surfaces of the light receiving elements 20 are disposed opposite the window portions 103. The projector 1 and the optical receiver 2 are disposed opposite each other with a predetermined interval such that each light emitting element 10 and each light receiving element 20 are disposed opposite each other on a one-to-one basis. Therefore, positions and orientations of optical axes of the light emitting element 10 and the light receiving element 20 are aligned with each other in each combination of the light emitting element 10 and the light receiving element 20.

Figure 2:
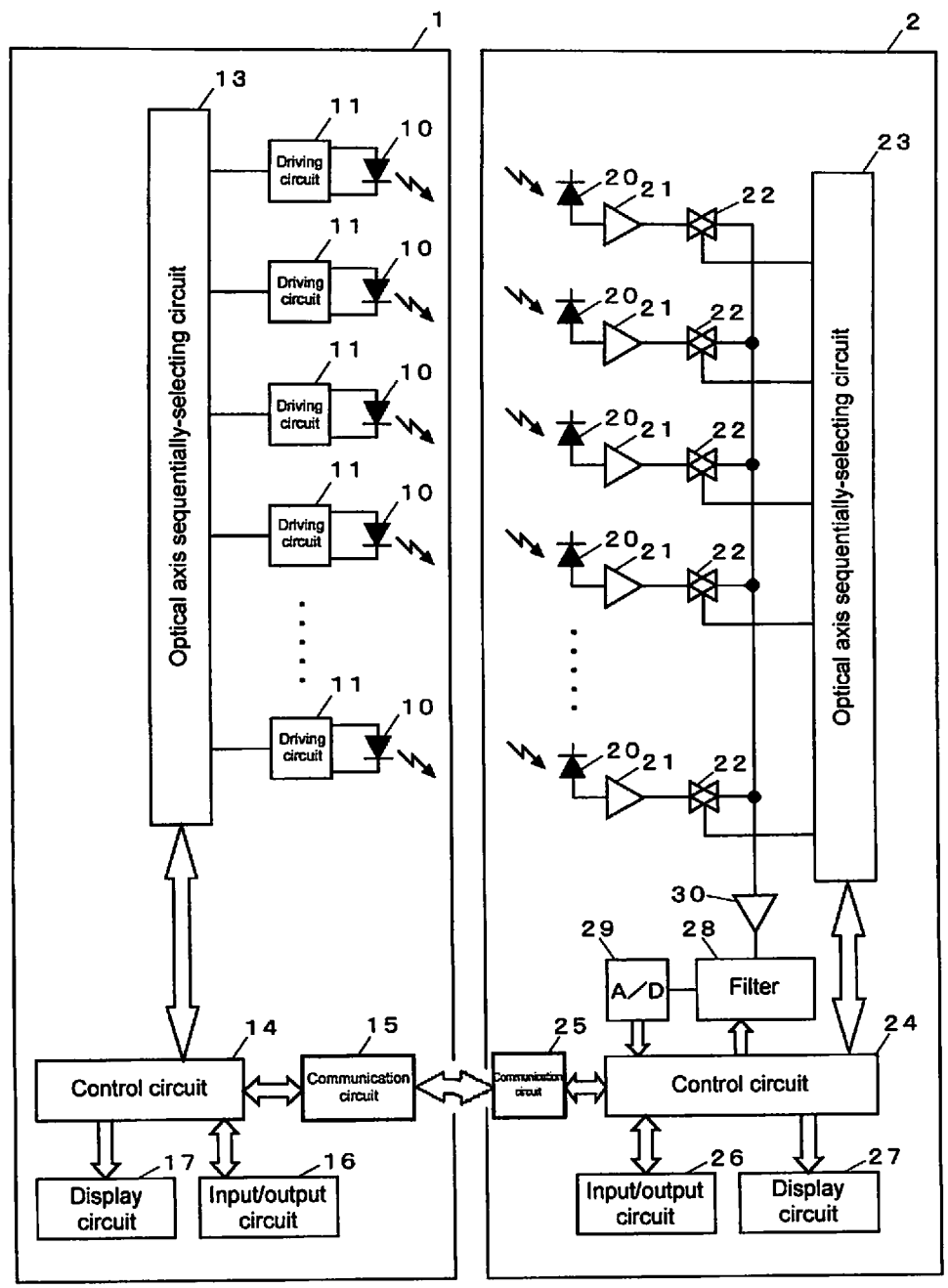
FIG. 2 is a block diagram of the multiple optical axis photoelectric sensor.

FIG. 2 illustrates an electric configuration of the multiple optical axis photoelectric sensor.

In the projector 1, a driving circuit 11 is provided in each light emitting element 10. An optical axis sequentially-selecting circuit 13, a control circuit 14, a communication circuit 15, an input/output circuit 16, and a display circuit 17 are also provided in the projector 1.

Each light emitting element 10 is connected to the control circuit 14 through the driving circuit 11 and the optical axis sequentially-selecting circuit 13.

In the optical receiver 2, an amplifier circuit 21 and an analog switch 22 are provided in each light receiving element 20. An optical axis sequentially-selecting circuit 23, a control circuit 24, a communication circuit 25, an input/output circuit 26, a display circuit 27, a filter 28, an A/D conversion circuit 29, and an amplifier circuit 30 are also provided in the optical receiver 2.

Each of the control circuits 14 and 24 includes a CPU and a memory.

Each of the optical axis sequentially-selecting circuits 13 and 23 of the projector 1 and the optical receiver 2 sequentially validates the optical axes. The control circuits 14 and 24 of the projector 1 and the optical receiver 2 communicate with each other through the communication circuits 15 and 25 to synchronize switching operations of the optical axis sequentially-selecting circuits 13 and 23. The control circuit 14 of the projector 1 outputs a lighting control signal in synchronization with the switching operation, thereby sequentially lighting the light emitting elements 10 from the top optical axis.

The control circuit 24 of the optical receiver 2 sequentially puts the analog switches 22 into an on-state by the switching operation of the optical axis sequentially-selecting circuit 23. Therefore, a light reception signal from the light receiving element 20 corresponding to the lit light emitting element 10 is guided to the A/D conversion circuit 29 through the amplifier circuit 30 and the filter 28 and converted into a digital signal, and the digital signal is input to the control circuit 24. The control circuit 24 compares the input light receiving amount to a predetermined light entrance threshold to detect whether each optical axis is in a light entrance state or a light obstruction state.

The input/output circuit 26 of the optical receiver 2 includes two output ports that output the control signals (described later). The control signals control an operation of a relay incorporated in a power supply route of a machine in a dangerous region (not illustrated), and usually the on-state (high-level) control signals are output in order to supply the power to the machine. However, when one of the optical axes is determined to be in the light obstruction state, or when some sort of abnormality is detected in the projector 1 or the optical receiver 2, each control signal is set to the off-state (low-level), namely the state in which the output is stopped.

Although not illustrated in FIGS. 1 and 2, a plurality of indicating lamps are provided at proper positions in front surfaces of the projector 1 and the optical receiver 2 in order to indicate a function set to the sensor, an operating state, and the light receiving amount of each optical axis. The display circuits 17 and 27 control the operations of the indicating lamps.

Figure 3:
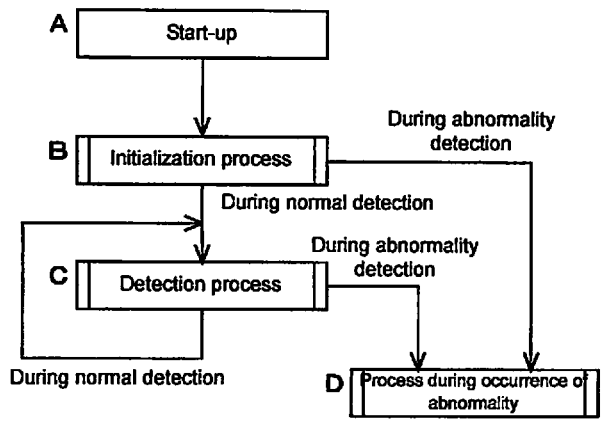
FIG. 3 is a flowchart schematically illustrating an operation of the multiple optical axis photoelectric sensor.

FIG. 3 schematically illustrates a flow of an operation of the multiple optical axis photoelectric sensor.

As illustrated in FIG. 3, after the multi-optical axis photoelectric sensor is powered on (Step A), an initialization process is performed (Step B), and a process of sequentially detecting light incident/blocking of the optical axes (Step C) is repeatedly performed. When the light obstruction of the optical axis is detected through the detection process, or when some sort of abnormality is detected through the initialization process or the detection process, the flow goes to a process during the occurrence of abnormality (Step D).

In the process during the occurrence of abnormality, the control signal to the relay is set to an off-state. Therefore, safety can be secured because the supply of the power to the machine in the dangerous region is stopped.

Figure 4:
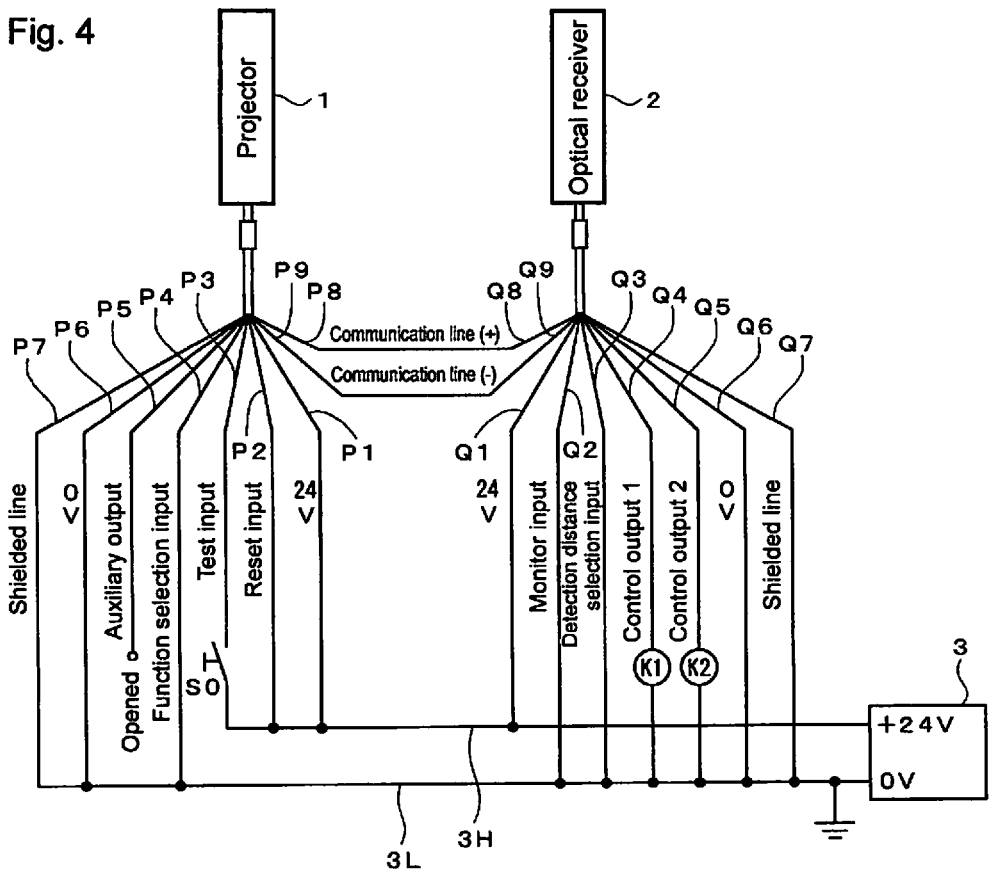
FIG. 4 is a view illustrating a wiring state of each signal line of the multi-optical axis photoelectric sensor.

FIG. 4 illustrates an example of wiring signal lines in the projector 1 and the optical receiver 2. This wiring is achieved by guiding the signal lines to proper points through the cables 101 and 102 of FIG. 1.

As illustrated in FIG. 4, 24-V power supply lines P1 and Q1, 0-V power supply lines P6 and Q6, shielded lines P7 and Q7, and communication lines P8, P9, Q8, and Q9 are provided in the projector 1 and the optical receiver 2, respectively. The power supply lines P1, P6, Q1, and Q6 are used to supply power to a power supply circuit (not illustrated) in the casing 100, the power supply lines P1 and Q1 are connected to a 24-V power supply line (high-level power supply line) 3H from a DC power source 3, and the power supply lines P6 and Q6 are connected to a 0-V power supply line (low-level power supply line) 3L from the DC power source 3. The shielded lines P7 and Q7 are also connected to the 0-V power supply line 3L.

The communication lines P8, P9, Q8, and Q9 are connected to the communication lines 15 and 25 of FIG. 2 to transmit communication signals generated by the control circuits 14 and 24 of the projector 1 and the optical receiver 2.

A reset signal inputting signal line P2, a test signal inputting signal line P3, an interlock function selecting signal line P4, and an auxiliary output signal line P5 are provided in the projector 1. In addition to two signal lines Q4 and Q5 used to output the control signals, a detection distance selecting signal line Q3 and a relay operation monitoring signal inputting signal line Q2 are provided in the optical receiver 2.

The control signal outputting signal lines Q4 and Q5 of the optical receiver 2 are connected to the 0-V power supply line 3L through coils K1 and K2 of the relays. Therefore, the coils K1 and K2 are magnetically excited while the high-level control signals are output to the signal lines Q4 and Q5. The normally-open contacts (not illustrated) of the relays incorporated in the power supply route of the machine are closed to supply the power to the machine. On the other hand, when the control signals to the signal lines Q4 and Q5 become the low level, the coils K1 and K2 are demagnetized to open normally-open contacts of the relays, and the supply of the power to the machine is stopped.

Similarly to the signal lines Q4 and Q5, the auxiliary output signal line P5 of the projector 2 is connected when used. On the other hand, when not used, the auxiliary output signal line P5 is set to an opened state as illustrated in FIG. 4.

A connection state of each input signal line is changed by an operation mode set to the sensor. Specifically, in the case that an automatic reset mode relating to the interlock function is set, as illustrated in FIG. 4, the reset inputting signal line P2 of the projector 1 is connected to the 24-V power supply line 3H, and the function selecting signal line P4 is connected to the 0-V power supply line 3L. On the other hand, in the case that a manual reset mode is set, similarly to a conventional example illustrated in of FIG. 11(2), the function selection inputting signal line P4 is connected to the 24-V power supply line 3H, and the reset inputting signal line P2 is connected to the 24-V power supply line 3H through a normally-open switch S1.

When a test mode is performed to confirm the sensor operation, as illustrated in FIG. 4, a test inputting signal line P3 of the projector 1 is connected to the 24-v power supply line 3H through a normally-open switch S0. On the other hand, when the test mode is not performed, the test inputting signal line P3 is set to the opened state.

The selection of the detection distance means that the operation mode is selected according to a distance between the projector 1 and the optical receiver 2. Two ways, namely, a short-range mode (applied when a distance between devices is within 7 m) and a long-range mode (applied when the distance between devices ranges from 5 to 20 m) are set in the embodiment. The signal line Q3 of the optical receiver 2 is connected to the 24-V power supply line 3H in the case that the long-range mode is selected, and the signal line Q3 of is connected to the 0-V power supply line 3L in the case that the short-range mode is selected. The long-range mode differs from the short-range mode in parameters, such as emission intensity of a projector element 10, a gain of a light receiving amount, and a light entrance determination threshold, which are necessary for the detection process.

Figure 5:
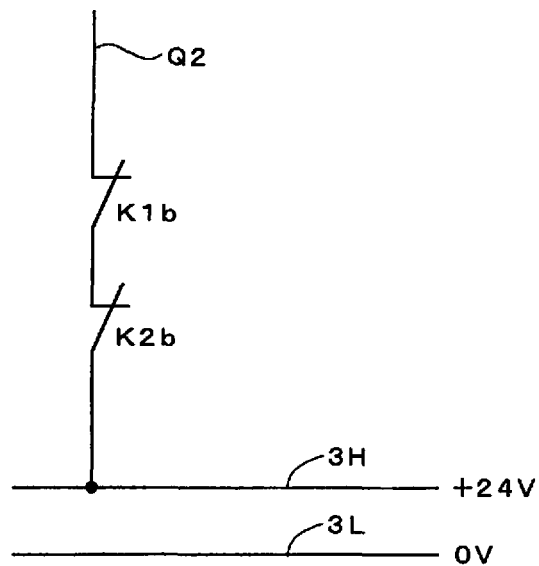
FIG. 5 is a view illustrating a wiring state of a signal line Q2 when a monitor input of relay is performed.

As to a monitor input of the relay, when the monitor input function is not utilized, the signal line Q2 is directly connected to the 0-V power supply line 3L as illustrated in FIG. 4. On the other hand, when the monitor input function is utilized, as illustrated in FIG. 5, the signal line Q2 is short-circuited to the 24-V power supply line 3H through a circuit in which normally-closed contacts K1b and K2b of relays are connected in series.

Because the multi-optical axis photoelectric sensor having the above configuration is intended to prevent the human body from entering the dangerous region, change of operation mode setting is not permitted during sensor operation. Therefore, in the embodiment, the input signals relating to the settings of the interlock function and the detection distance are periodically checked during the operation of the sensor, and the outputs to the signal lines Q4 and Q5 are immediately set to the off-state when a change in signal is detected.

Figure 6:
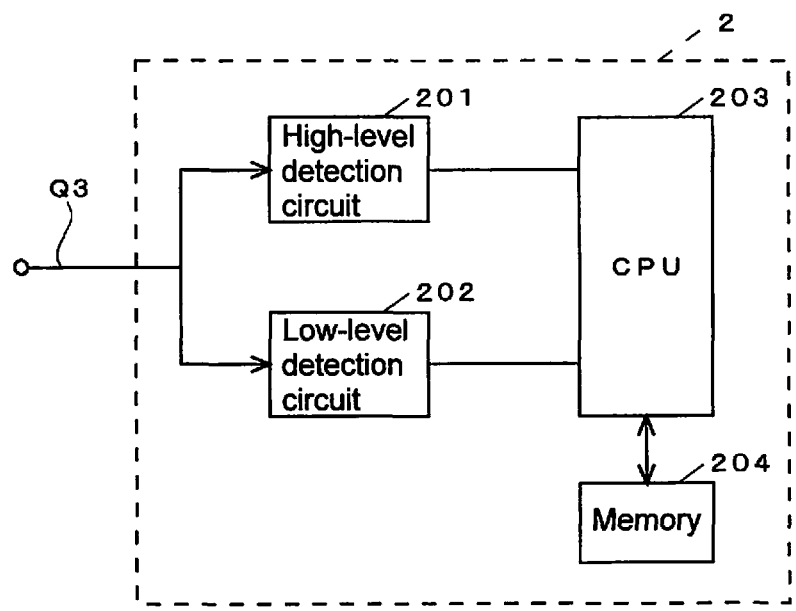
FIG. 6 is a block diagram illustrating a circuit configuration in an optical receiver 2 with respect to a signal line Q3 for selecting a detection distance.

Additionally, in the embodiment, a circuit having a configuration illustrated in FIG. 6 is provided in the optical receiver 2 with respect to the signal line Q3 used to input a signal fixing a detection process parameter, and the reliability of the signal is enhanced by confirming a signal state from the signal line Q3.

The circuit of FIG. 6 includes a high-level detection circuit 201, a low-level detection circuit 202, a CPU 203, and a memory 204. The detection circuits 201 and 202 are included in the input/output circuit 27 of FIG. 2, and the CPU 203 and the memory 204 are included in the control circuit 24.

The signal input to the optical receiver 2 from the signal line Q3 of a monitoring target is input to the high-level detection circuit 201 and the low-level detection circuit 202. Each of the detection circuits 201 and 202 includes a voltage detection circuit. Twenty four V is used as a reference voltage in the high-level detection circuit 201, and the high-level detection circuit 201 outputs a detection signal, which becomes the on-state when a signal within a given range including the reference voltage is input. In the low-level detection circuit 202, 0 V is used as the reference voltage, and the low-level detection circuit 202 outputs a detection signal, which becomes the on-state when a signal having a voltage within a given range including the reference voltage is input.

Numerical ranges that are set as a voltage within a given range including the reference voltage to the detection circuits 201 and 202 do not overlap each other. That is, an upper limit of the input voltage range when the low-level detection circuit 202 outputs the on-state detection signal is not set higher than a lower limit of the input voltage range when the high-level detection circuit 201 outputs the on-state detection signal.

The detection circuits 201 and 202 are not limited to the detection circuits that process the above signal voltage levels, but the detection circuits 201 and 202 may process predetermined variables into which the voltage levels of the signals are converted. In the embodiment, the voltage at the high-level power supply line 3H is set to 24 V, and the voltage at the low-level power supply line 3L is set to 0 V. There is no limitation to the voltages at the high-level and low-level power supply lines 3H and 3L. For example, a voltage (for example, an external power supply voltage) higher than 24 V may be applied to the power supply line 3H. A voltage (however, a voltage lower than the power supply line 3H) higher than 0 V may be applied to the power supply line 3L.

Figures 7, 8:
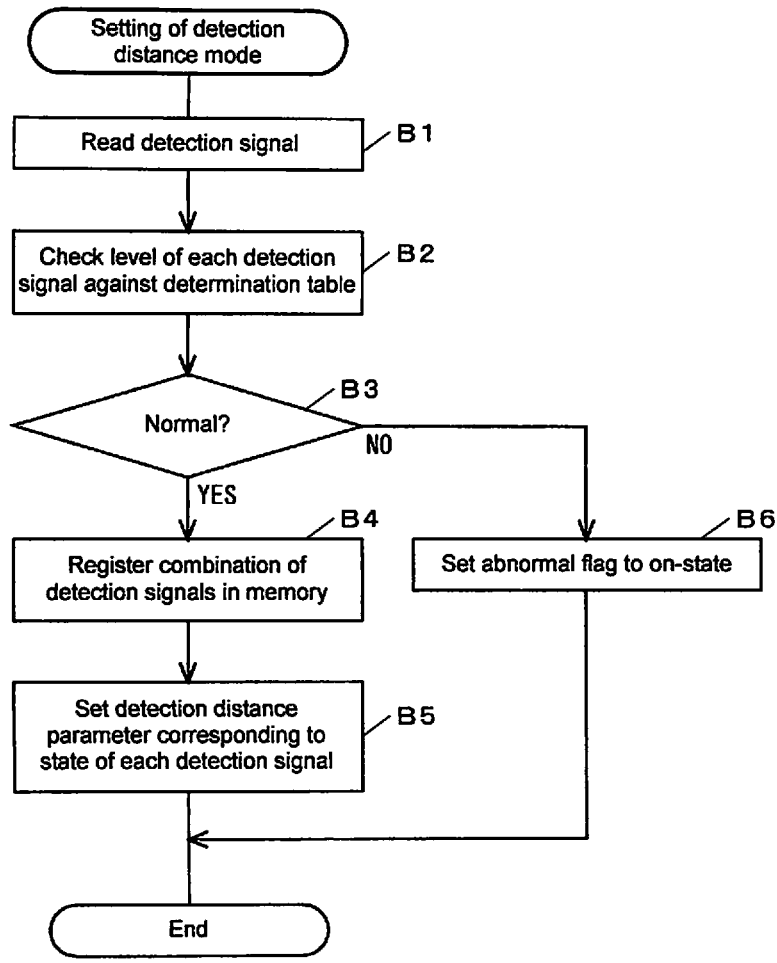
FIG. 7 is a flowchart illustrating a procedure of setting process of a detection distance mode.
FIG. 8 is a view illustrating a data configuration of a determination table used in a determination process of each detection signal.
Figure 9:
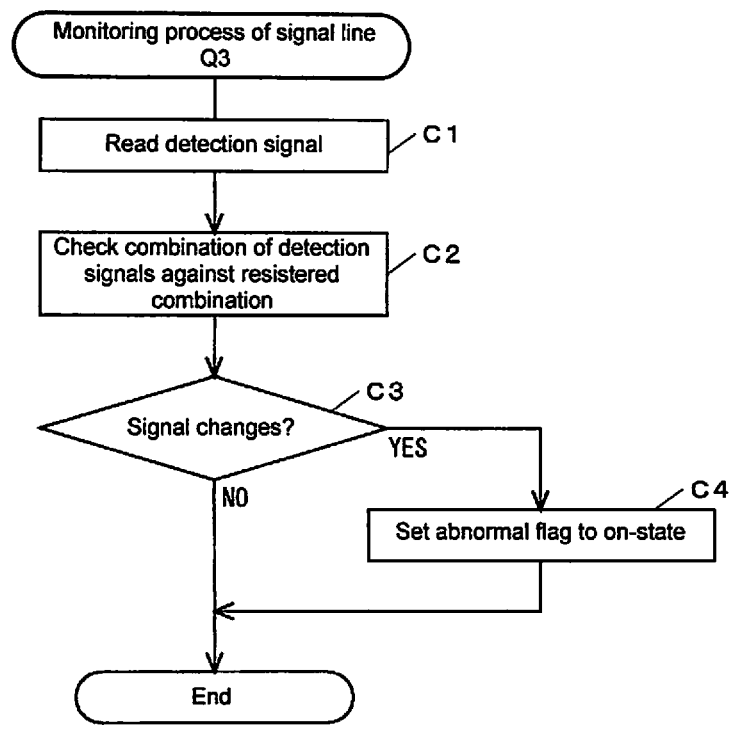
FIG. 9 is a flowchart illustrating a procedure of monitoring process of the signal line Q3.
Figure 10:
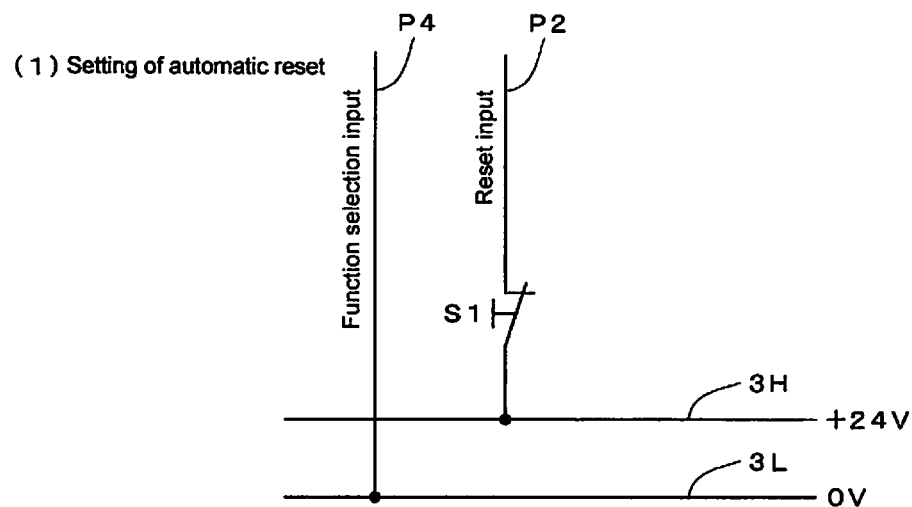
FIG. 10 is a view illustrating a difference in wiring according to operation selection with respect to an interlock function.
Figure 10:
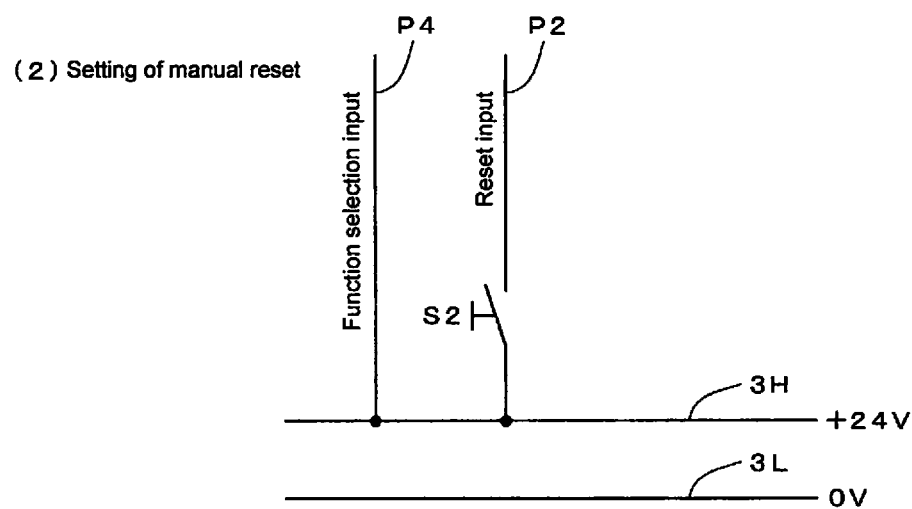

Programs for executing processes of FIGS. 7 and 9 and a determination table of FIG. 8 are included in the memory 204. Based on the programs and the determination table, the CPU 203 performs the monitoring process using the detection signals from the detection circuits 201 and 202.

The process of FIG. 7 is included in the initialization process (Step B) of FIG. 3. In the process, the detection signals from the detection circuits 201 and 202 are read first (Step B1), and the states of the detection signals are checked against the determination table of FIG. 8 (Step B2).

In the determination table, a combination of the detection signals is correlated with the determination result, and the combination in which one of the two detection signals is in the on-state while the other detection signal is in the off-state is set to "normal." The determination result that the signal line Q3 is connected to the 24-V power supply line 3H, is correlated with the combination in which the detection signal from the high-level detection circuit 201 is in the on-state while the detection signal from the low-level detection circuit 202 is in the off-state. The determination result that the signal line Q3 is connected to the 0-V power supply line 3L is correlated with the combination in which the detection signal from the high-level detection circuit 201 is in the off-state while the detection signal from the low-level detection circuit 202 is in the on-state.

The determination result of abnormal connection (the signal line Q2 is in the opened state) is correlated with the combination in which both the detection signals are in the off-state, and the determination result that a peripheral circuit of the signal line Q3 is abnormal is correlated with the combination in which both the detection signals are in the on-state.

Referring back to FIG. 7, the CPU 203 checks the detection signals read from the detection circuits 201 and 202 against the determination table. When determining that the combination of the detection signals is normal ("YES" in Step B3), the CPU 203 registers the combination of the detection signals in the memory 204 (Step B4). A parameter matched with a detection distance corresponding to the combination of the detection signals is set (Step B5), and the process is ended.

On the other hand, when the combination of the detection signals indicates the abnormal connection or the abnormal circuit ("NO" in Step B3), the combination of the detection signals is not registered, but an abnormal flag is set to an on-state (Step B6). The abnormal flag indicates that the detection distance is unsuccessfully selected. When the abnormal flag becomes the on-state, the flow goes to the process during the occurrence of abnormality (Step D of FIG. 2) after the initialization state is ended.

When the initialization process including the process of FIG. 7 is performed with no trouble, the flow goes to a detection process (Step C). In the detection process, the monitoring process of FIG. 9 is performed with every given time (for example, each second).

In the monitoring process, the detection signals from the detection circuits 201 and 202 are read (Step C1), and the combination of the detection signals is checked against the combination registered in the memory 204. When each detection signal does not change ("NO" in Step C), the determination that the signal line Q3 is normal is made to end the monitoring process.

On the other hand, when the combination of the levels of the detection signals differs from the combination registered in the memory 204 ("YES" in Step C3), the abnormal flag is set to the on-state. Therefore, the flow exits from the loop of the detection process (Step C) to go to the process during the occurrence of abnormality (Step C4).

According to the monitoring process of FIG. 9, when the connection of the signal line Q3 for selecting the detection distance changes while the sensor runs, the control signals output to the signal lines Q4 and Q5 can immediately be set to the off-state. Therefore, when the signal line Q3 is disconnected, when the connection of the signal line Q3 is changed, or when the signal line Q3 or the peripheral circuit thereof has a breakdown, power to the machine can be terminated immediately for safety.

On the other hand, the process of FIG. 7 is performed every time the power is turned on to go to the initialization process (Step B). Therefore, when the necessity to change the detection distance is generated, the user changes the wiring of the signal line Q3 to change the detection distance after turning off the power of the sensor, which allows the projector 1 and the optical receiver 2 to be operated in the operation mode suitable to the post-change detection distance.

Note that in the embodiment, the high-level detection circuit 201 and the low-level detection circuit 202 are provided while directed only to the signal line Q3 for selecting the detection distance of the optical receiver 2, and the processes of FIGS. 7 and 9 are performed. Alternatively, the reliability of the input signal may be enhanced in the same way as the signal line Q3 for the function selecting signal line P4, the reset inputting signal line P2, and the monitoring inputting signal line Q2.

DESCRIPTION OF SYMBOLS

Q2, Q3, P2, P3, P4 Input signal line
201 High-level detection circuit
202 Low-level detection circuit
203 CPU
204 Memory

The invention claimed is:

1. A safety sensor comprising a plurality of input signal lines for inputting signals used for setting an operation mode, the operation mode being set according to a connection state of each input signal line to a high-level power supply line or a low-level power supply line, and an output from the safety sensor being stopped upon detection of an object or an abnormality, the safety sensor comprising:
a first detection circuit that monitors at least one input signal line, outputs an on-state upon detecting a high level voltage applied to the monitored signal line, and outputs an off-state when not detecting a high level voltage applied to the monitored signal line;
a second detection circuit that outputs an on-state upon detecting a low voltage applied to the monitored signal line, and outputs an off-state when not detecting a low level voltage applied to the monitored signal line;
a memory for registering on/off states of the detection signals from the first and second detection circuits;
a registration setting unit configured to register the on/off states of each detection signal in the memory on condition that the on/off states of the detection signals from the first and second detection circuits are conflicting during an initialization process that permits setting of the operation mode, determine a connection state of the monitored signal line based on the on/off states of the detection signals, and set the operation mode according to the connection state of the monitored signal line; and
an abnormality detection unit configured to monitor the detection signals from the first and second detection circuits after the registration in memory, and to determine an abnormality in the connection state of the monitored signal line when at least the on/off state of one of the detection signals differs from a state registered in the memory.

2. The safety sensor according to claim 1, wherein the registration setting unit determines that the abnormality occurs in the monitored signal line or a peripheral circuit thereof when the on/off states of the detection signals from the first and second detection circuits are the same during the initialization process.

3. A method for detecting abnormality in a safety sensor comprising a plurality of input signal lines for inputting signals used for setting an operation mode, the operation mode being set according to a connection state of each input signal line to a high-level power supply line or low-level power supply line, and an output from the safety sensor being stopped upon detection of an object or an abnormality, the safety sensor comprising:
a first detection circuit that monitors at least one input signal line, outputs an on-state upon detecting a high level voltage applied to the monitored signal line, and outputs an off-state when not detecting a high level voltage applied to the monitored signal line;
a second detection circuit that outputs an on-state upon detecting a low voltage applied to the monitored signal line, and outputs an off-state when not detecting a low level voltage applied to the monitored signal line;
a memory for registering on/off states of the detection signals from the first and second detection circuits, the method for detecting abnormality comprising:
registering the on/off states of each detection signal in the memory on condition that the on/off states of the detection signals from the first and second detection circuits are conflicting during an initialization process that permits setting of the operation mode,
determining a connection state of the monitored signal line based on the on/off states of the detection signals, and setting the operation mode according to the connection state of the monitored signal line;
monitoring the detection signals from the first and second detection circuits after the registration in memory; and
determining an abnormality in the connection state of the monitored signal line when at least the on/off state of one of the detection signals differs from a state registered in the memory.

* * * * *